(12) United States Patent
Kuramori

(10) Patent No.: US 7,614,437 B2
(45) Date of Patent: Nov. 10, 2009

(54) TIRE/WHEEL ASSEMBLY BODY

(75) Inventor: Akira Kuramori, Hiratsuka (JP)

(73) Assignees: The Yokohama Rubber Co., Ltd., Tokyo (JP); Central Motor Wheel Co., Ltd., Anjyo-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 376 days.

(21) Appl. No.: 10/542,034

(22) PCT Filed: Feb. 19, 2004

(86) PCT No.: PCT/JP2004/001911

§ 371 (c)(1), (2), (4) Date: Jul. 13, 2005

(87) PCT Pub. No.: WO2004/074014

PCT Pub. Date: Sep. 2, 2004

(65) Prior Publication Data

US 2006/0124220 A1    Jun. 15, 2006

(30) Foreign Application Priority Data

Feb. 24, 2003  (JP)  ............................. 2003-046288

(51) Int. Cl.
*B60B 3/00* (2006.01)
*B60C 1/00* (2006.01)
*B60C 9/18* (2006.01)
*B60C 9/20* (2006.01)
*B60C 9/22* (2006.01)

(52) U.S. Cl. .................. 152/531; 152/526; 152/533; 152/537; 301/65

(58) Field of Classification Search ................. 152/526, 152/531, 533, 537; 301/65
See application file for complete search history.

(56) References Cited

U.S. PATENT DOCUMENTS 6,074,015 A * 6/2000 Renard et al.
6,103,811 A   8/2000 Midorikawa et al.
7,086,440 B2 * 8/2006 Baran ..................... 152/531 X

FOREIGN PATENT DOCUMENTS

| EP | 0 554 108 A1 * | 8/1993 |
| EP | 1 241 023 A2 * | 9/2002 |
| JP | 05-238205 A | 9/1993 |
| JP | 06-212025 A | 8/1994 |
| JP | 2000158902 A * | 6/2000 |

(Continued)

OTHER PUBLICATIONS

English machine translation of JP 5-238205 A, Sep. 17, 1993.*

(Continued)

*Primary Examiner*—Adrienne C Johnstone
(74) *Attorney, Agent, or Firm*—Greer, Burns & Crain, Ltd.

(57) ABSTRACT

A tire/wheel assembly body enables reduction of road noise while reducing unsprung mass using a light-metal wheel. The tire/wheel assembly body is formed by installing a pneumatic tire on the light-metal wheel with a rigidity index ($\alpha$) of 35 to 65 (1/rad). In the pneumatic tire, reinforcement layers are arranged at end portions of a belt layer.

5 Claims, 2 Drawing Sheets

FOREIGN PATENT DOCUMENTS

| | | | |
|---|---|---|---|
| JP | 2001-180220 | A | 7/2001 |
| JP | 2002-079806 | A | 3/2002 |
| JP | 2002187402 | A * | 7/2002 |
| JP | 2002-274103 | A | 9/2002 |
| JP | 2002-356103 | A | 12/2002 |
| WO | WO-01/92039 | A1 * | 12/2001 |

OTHER PUBLICATIONS

English machine translation of JP 2001-180220 A, Jul. 3, 2001.*
English machine translation of JP 2002-356103 A, Dec. 10, 2002.*
PCT International Search Report for PCT/JP2004/001911 mailed on Jun. 1, 2004.

* cited by examiner though an axle. Thus, the vehicle interior is sympathetically vibrated to generate road noise of around 300 Hz.

TIRE/WHEEL ASSEMBLY BODY

TECHNICAL FIELD

The present invention relates to a tire/wheel assembly body, and more particularly relates to a tire/wheel assembly body which makes it possible to reduce road noise by using a light-metal wheel.

BACKGROUND ART

When an unsprung mass of a vehicle is reduced, there is an effect that riding comfortableness is improved, and fuel consumption can be reduced. As the most common means for reducing the unsprung mass as described above, a light-metal wheel is used as a wheel as disclosed in Japanese patent application Kokai publication No. 2002-274103.

In the case where the unsprung mass is reduced by use of the light-metal wheel, the larger a rate of the reduction gets, the more the riding comfortableness is improved. However, on the other hand, rigidity of the wheel is lowered. Thus, noise (road noise) generated in a vehicle interior tends to get gradually worse. Particularly, road noise of around 300 Hz frequency is increased. Therefore, an object in the case where the light-metal wheel is used is to figure out how the foregoing road noise of around 300 Hz frequency can be reduced.

DISCLOSURE OF THE INVENTION

It is an object of the present invention to provide a tire/wheel assembly body which makes it possible to reduce road noise while reducing unsprung mass using a light-metal wheel.

A tire/wheel assembly body of the present invention to achieve the foregoing object is a tire/wheel assembly body formed by installing a pneumatic tire on a light-metal wheel with a rigidity index ($\alpha$) of 35 to 65 (1/rad). In the pneumatic tire, reinforcement layers are arranged at end portions of a belt layer.

When the rigidity index ($\alpha$) of the light-metal wheel is reduced to a level of 65 (1/rad) or lower, rigidity of the wheel is also reduced. Accordingly, the reduction in the rigidity of the wheel also lowers a natural frequency. Thus, the natural frequency of the wheel gets close to a natural frequency (around 300 Hz) of a pseudo cross-section secondary mode that a pneumatic tire having a normal tire structure has. Therefore, the light-metal wheel is vibrated sympathetically with vibration of around 300 Hz, which is caused by the pneumatic tire during running. Accordingly, vibration caused by the sympathetic vibration is transmitted to a vehicle interior through an axle. Thus, the vehicle interior is sympathetically vibrated to generate road noise of around 300 Hz.

However, according to the tire/wheel assembly body of the present invention, the reinforcement layers are arranged at the end portions of the belt layer in the pneumatic tire installed on the light-metal wheel. Accordingly, rigidity of a shoulder portion is increased. Thus, a natural frequency of the shoulder portion is increased and can be shifted from the natural frequency of the light-metal wheel. Therefore, the light-metal wheel is no longer vibrated sympathetically with vibration of the pneumatic tire, and vibration of around 300 Hz is no longer transmitted to a vehicle interior. Thus, road noise caused by sympathetic vibration of the vehicle interior can be eliminated.

BEST MODE FOR CARRYING OUT THE INVENTION

In a tire/wheel assembly body of the present invention, a light-metal wheel is used as a wheel. Moreover, a rigidity index ($\alpha$) of the light-metal wheel is significantly reduced to a range of 35 to 65 (1/rad), preferably, 40 to 50 (1/rad).

As described above, rigidity of the wheel is significantly reduced so as to set the rigidity index ($\alpha$) in the range of 35 to 65 (1/rad). Thus, riding comfortableness is significantly improved compared to a conventional steel wheel, and fuel consumption is also reduced. If the rigidity index ($\alpha$) of the wheel is larger than 65 (1/rad), improvement in the riding comfortableness as described above can no longer be achieved. Moreover, if the rigidity index ($\alpha$) of the wheel is smaller than 35 (1/rad), durability of the wheel is lowered, which makes it difficult to put the wheel to practical use.

In the present invention, light-metal which forms the wheel is not particularly limited as long as the above-described range of the rigidity index ($\alpha$) is satisfied. Generally, aluminum or an aluminum alloy is favorably used. As light metal other than aluminum, magnesium, titanium, alloys thereof, or the like can be used.

The rigidity index ($\alpha$) which specifies the rigidity of the wheel in the present invention means a characteristic value measured as described below.

Figure 3:
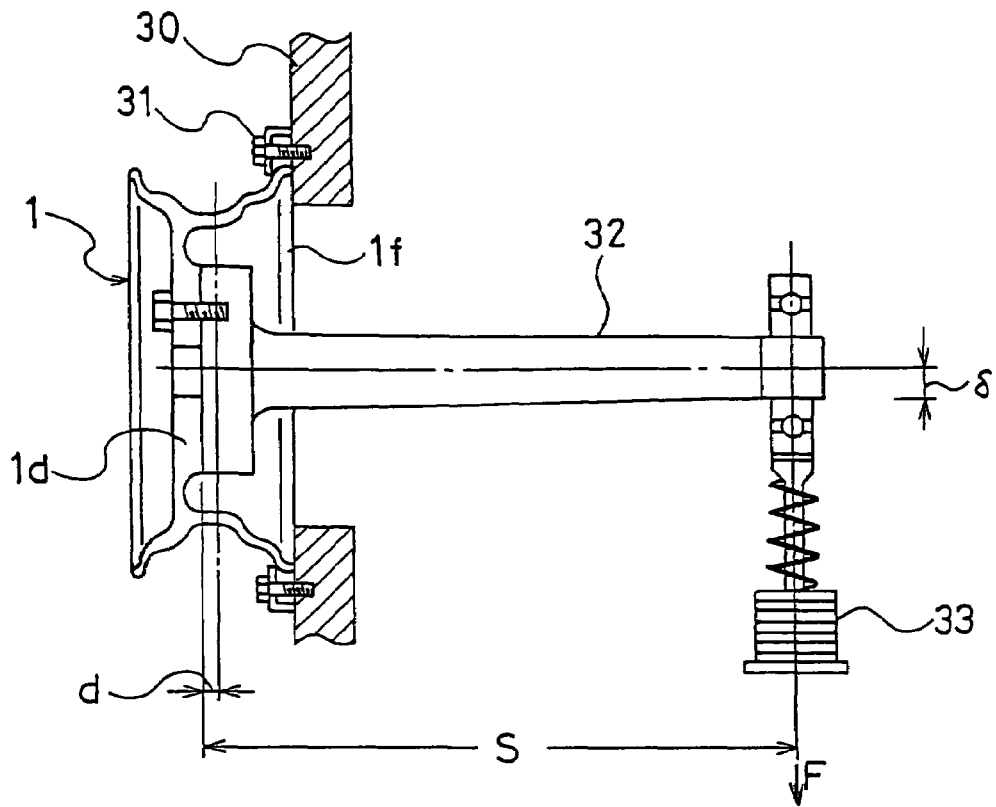
FIG. 3 is an explanatory view showing a method for measuring a rigidity index of a wheel.

As shown in FIG. 3, an inner flange portion 1$f$ of a light-metal wheel 1 is fixed to a fixed base 30 by use of a fastener 31, and a load arm 32 is fixed to a disc 1$d$ of the wheel 1 so as to align shafts thereof with each other. Moreover, a force F (kN) is applied by suspending a weight 33 from a rear end portion of the load arm 32, the weight 33 being positioned away from a disc surface by a distance S. Accordingly, a displacement $\delta$ caused in this event is obtained.

Note that, here, the inner flange portion 1$f$ means a flange portion which faces a vehicle when the wheel is installed on the vehicle. Moreover, the force F (kN) applied here means a maximum value (specified by Japan Automobile Tire Manufacturers Association) of a load corresponding to a maximum loading capacity of a vehicle tire applied to the wheel. However, when the present invention is intended for specific vehicles, the force F is set to a maximum value of wheel reaction forces of those vehicles during rest.

From a measurement result of the displacement $\delta$ described above, a wheel rigidity K (=loaded moment/displacement angle) is found by the following equation (1). The loaded moment (kN·m) is given by F×S, and the displacement angle (rad) is given by $\delta$/S.

$$K = FS^2/\delta (kN \cdot m/rad) \quad (1)$$

Next, the rigidity index (α) is calculated, as expressed by the following equation (3), by dividing the foregoing wheel rigidity K by a bending moment M found by the following equation (2).

$$M = Sm \times F \times (\mu \times r - d)(kN \cdot m) \quad (2)$$

$$\alpha = K/M (1/rad) \quad (3)$$

Note that, in the foregoing equation (2), Sm is a coefficient, which is 1.5. As testing conditions equivalent to or more than the above, when a light metal material of the wheel is an alloy of the alloy number 5000 level defined by JIS H4000 "Plates and Strips of Aluminum and Aluminum Alloys", and a magnesium content is 3% or less, Sm is 1.8. Meanwhile, when the light metal material is an aluminum alloy of a casting/forging material, Sm is 2.0.

μ is a coefficient of friction between a tire and a road surface, and is 0.7.

r (m) is a maximum value (specified by Japan Automobile Tire Manufacturers Association) of a static load radius of the vehicle tire applied to the wheel. However, when the present invention is intended for specific vehicles, r (m) is set to a maximum value of static load radii of vehicle tires designated for those vehicles.

Moreover, d (m) is a distance between an attachment surface of the wheel to the vehicle and a rim center line.

Meanwhile, as a pneumatic tire installed in the tire/wheel assembly body of the present invention, used is one in which reinforcement layers are arranged at end portions of a belt layer provided along a circumferential direction of the tire in a periphery of a carcass layer.

In this pneumatic tire, since the reinforcement layers are arranged at the end portions of the belt layer, rigidity of a shoulder portion is increased. Thus, the increase in the rigidity leads to a state where a natural frequency of the tire gets larger than that of a pneumatic tire having a normal structure. Meanwhile, as to the light-metal wheel, rigidity thereof is lowered by reduction in weight thereof. As a result, a natural frequency of the light-metal wheel gets close to a natural frequency (around 300 Hz) of the pneumatic tire having the normal structure.

Therefore, if the pneumatic tire continues to have a general normal structure, road noise of around 300 Hz frequency is generated in a vehicle interior during running. However, the pneumatic tire applied in the present invention has the natural frequency which gets larger than that of the tire having the normal structure as described above. Accordingly, the natural frequency thereof is shifted from the natural frequency of the light-metal wheel. Thus, the light-metal wheel is never vibrated sympathetically with vibration of the tire. Moreover, the road noise of around 300 Hz frequency is never generated in the vehicle interior.

The reinforcement layers used for the pneumatic tire in the present invention may be provided on an inner surface of the belt layer, on an outer surface thereof, or between layers as long as the reinforcement layers are arranged at the end portions of the belt layer. However, it is preferable that the reinforcement layers are arranged on the inner surface of the belt layer so as to be sandwiched between the belt layer and the carcass layer. Moreover, the reinforcement layers do not have to overlap the belt layer across the full width thereof, but may be partially extended to the outside of the belt layer having the maximum width (the belt layer on the inner side). It is preferable that, by setting the end portions of the belt layer having the maximum width as starting points, the reinforcement layers are extended to the inside of the belt layer by 5 mm and to the outside of the belt layer by 10 mm from the starting points.

A structure of the reinforcement layers is not particularly limited. However, it is preferable that the reinforcement layers are formed of reinforcing cords and coat rubber which covers the cords. As the reinforcing cords, cords made of nylon fibers, polyester fibers, polyvinylalcohol fibers, aramid fibers or the like can be used. Among those described above, particularly, it is preferable to use cords made of high modulus aramid fibers. As the coat rubber, high modulus rubber is preferably used. Specifically, rubber having tan δ of 0.15 to 0.25 is preferably used. Particularly, when reinforcement layers formed by combining coat rubber having tan δ within the foregoing range and aramid fiber cords are used, the rigidity of the shoulder portion can be further increased. Note that tan δ here is one measured under measurement conditions including a temperature of 60° C., an initial strain of 10%, an amplitude of ±2%, and a frequency of 20 Hz.

A winding angle of the reinforcing cords may be arbitrarily set. In the case of using cords having low elasticity such as nylon, polyester, and polyvinyl alcohol, it is preferable that the cords are wound in a spiral fashion at an angle of approximately 0° relative to the circumferential direction of the tire. Moreover, in the case of the high modulus aramid fiber cords, it is preferable that the cords are wound in a spiral fashion at an angle of larger than 0° to 15° relative to the circumferential direction of the tire.

Figure 1:
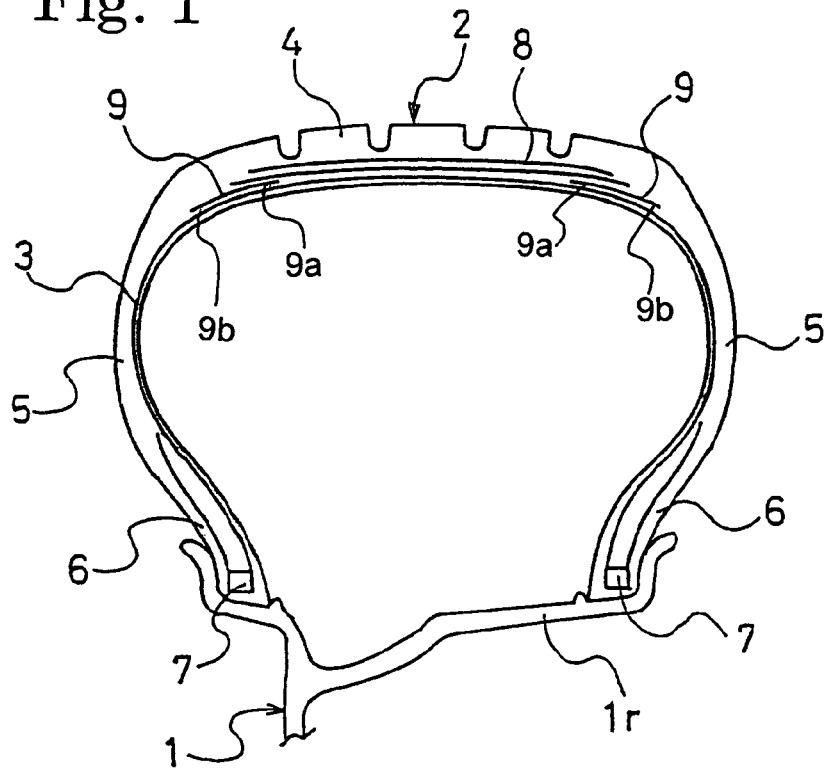
FIG. 1 is a meridian half sectional view showing a main part of a tire/wheel assembly body according to an embodiment of the present invention.

FIG. 1 is a meridian half sectional view showing a main part of a tire/wheel assembly body (wheel) according to an embodiment of the present invention.

The tire/wheel assembly body is formed by installing a pneumatic tire 2 on a rim 1r of a wheel 1. The wheel 1 is made of light metal such as an aluminum alloy. Moreover, the wheel has a rigidity index (α) reduced to 35 to 65 (1/rad), and is significantly reduced in weight. Since the rigidity of the wheel 1 is reduced as described above, riding comfortableness is significantly improved.

The pneumatic tire 2 has a carcass layer 3 formed by arranging carcass cords at a cord angle of approximately 90° relative to a circumferential direction of the tire. The carcass layer 3 is formed so as to extend from a tread 4 toward either side to bead portions 6, 6 through sidewall portions 5, 5, and to have its both end portions folded from an inner side of the tire toward an outer side thereof around bead cores 7, 7. On an outer peripheral side of the carcass layer 3, two belt layers 8 formed of steel cords are disposed so as to allow the cords to intersect with each other between the layers. At the both end portions of the belt layers 8, reinforcement layers 9 are provided so as to be sandwiched between the belt layers 8 and the carcass layer 3, respectively. The reinforcement layers 9 include extension portions 9a, 9b. As described above, extension portions 9a extend to the inside of the belt layer by 5 mm, and extension portions 9b extend to the outside of the belt layer by 10 mm.

By arranging the reinforcement layers 9 as described above, rigidity of a shoulder portion is increased, and the increase in the rigidity of the shoulder portion increases a natural frequency. Therefore, the natural frequency of the pneumatic tire is largely shifted from a natural frequency of the light-metal wheel 1. Accordingly, the light-metal wheel 1 is no longer vibrated sympathetically with vibration caused by the pneumatic tire 2 scraping a road surface. Thus, the vibration is no longer transmitted to a vehicle interior through the wheel 1 and an axle, and road noise of around 300 Hz frequency is never generated in the vehicle interior.

Note that, in the case of the embodiment shown in FIG. 1, the reinforcement layers 9 are arranged so as to be sandwiched between the innermost belt layer 8 and the carcass layer 3. However, the reinforcement layers 9 may be arranged on outer peripheral sides of the end portions of the belt layer 8 as in the case of an embodiment shown in FIG. 2. Moreover, although not shown, the reinforcement layers 9 may be inserted between the two belt layers 8.

The present invention will be specifically described below according to examples. However, the following examples are described for the purpose of exemplification, and must not be used for limited interpretation of the present invention.

EXAMPLES 1 TO 4 AND COMPARATIVE EXAMPLES 1 TO 8

Figure 2:
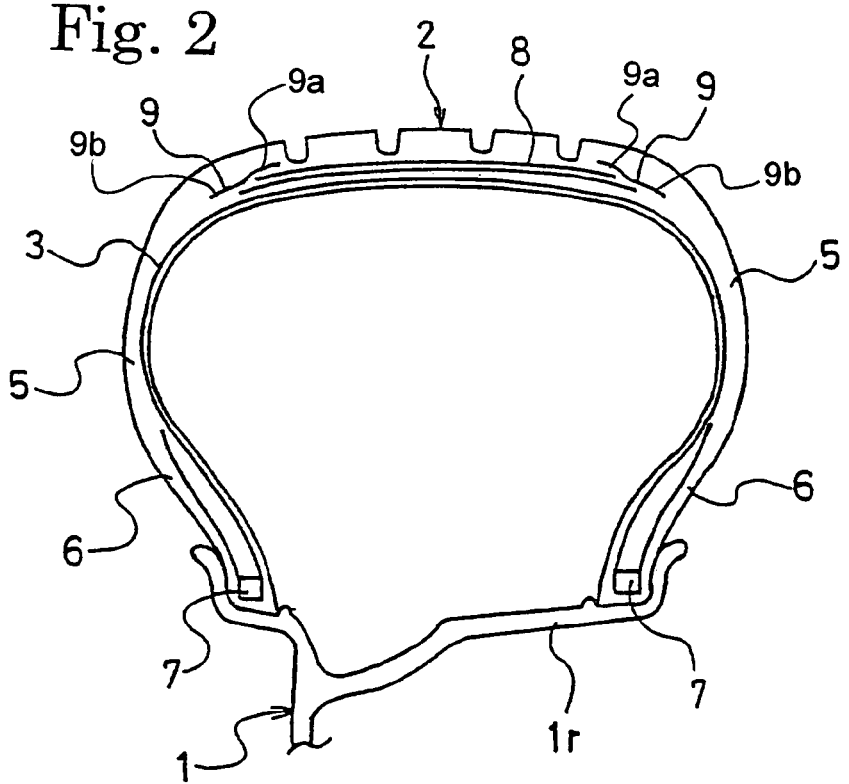
FIG. 2 is a meridian half sectional view showing a main part of a tire/wheel assembly body according to another embodiment of the present invention.

A pneumatic tire A having reinforcement layers provided therein, and a pneumatic tire B having no reinforcement layers provided therein are manufactured, each having a tire size of 195/60R15, a carcass layer formed of polyester cords, and a belt layer formed of steel cords. Specifically, the reinforcement layers of the tire A are formed by winding nylon fiber cords in a spiral fashion at approximately 0° relative to a circumferential direction of the tire on outer peripheral sides as shown in FIG. 2 of both end portions of the belt layer. Moreover, the reinforcement layers are covered with coat rubber having tan δ of 0.13.

Meanwhile, 7 kinds of wheels a to g are prepared, which are the same in a rim size of 6½ JJ×15, and are different from each other in a component, a rigidity index (α), and a mass as shown in Table 1. Note that, in Table 1, the masses of the wheels are indicated by indices obtained by setting a mass of a steel wheel a to 100.

TABLE 1

| Wheel | Component | Rigidity index (α) (1/rad) | Mass (index) |
|---|---|---|---|
| a | Steel | 72 | 100 |
| b | Aluminum alloy | 65 | 92 |
| c | Aluminum alloy | 55 | 86 |
| d | Aluminum alloy | 50 | 80 |
| e | Aluminum alloy | 40 | 71 |
| f | Aluminum alloy | 30 | 68 |
| g | Aluminum alloy | 25 | 65 |

By installing the foregoing pneumatic tires A and B on the foregoing 7 kinds of wheels a to g, respectively, 13 kinds of tire/wheel assembly bodies (wheels) having combinations shown in Table 2 are obtained (Examples 1 to 4, Conventional example, and Comparative examples 1 to 8).

As to the 13 kinds of tire/wheel assembly bodies described above, riding comfortableness, road noise, and durability are measured by use of the following testing methods, respectively. Thus, the results shown in Table 2 are obtained.

[Riding Comfortableness]

Test wheels (tire/wheel assembly bodies) are filled with air at an air pressure of 200 kPa, and are installed on a vehicle equipped with an engine of 2.5 liter displacement, respectively. Thereafter, riding comfortableness is evaluated based on feelings of 5 test drivers who test-drive the vehicle on a test course of 2.5 km a lap. By setting the conventional example to 3 points as a reference, grade points are indicated by differences from the reference.

[Road Noise]

The test wheels are filled with air at an air pressure of 200 kPa, and are installed on the same vehicle used for measurement of riding comfortableness. Moreover, a sensor is provided on a back of a driver's seat, and the vehicle is test-driven on the same test course. In this event, overall values (dB) of 200 to 315 Hz frequency noise are measured. The measurement results are indicated by differences from a measured value of the conventional example.

[Durability]

Figure 4:
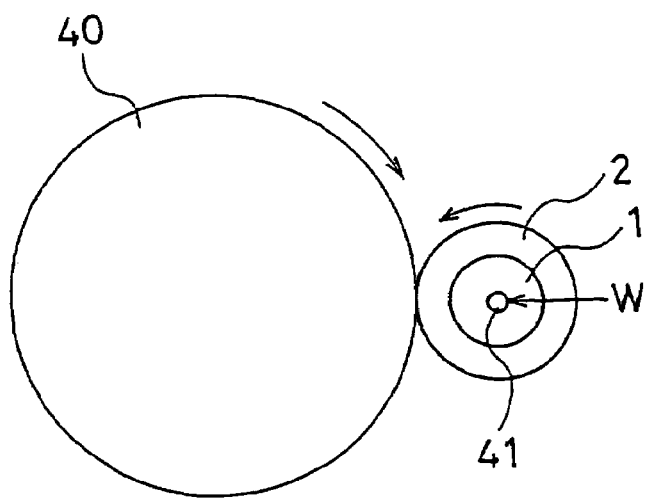
FIG. 4 is an explanatory view of a durability testing device for the tire/wheel assembly body.

As shown in FIG. 4, the air pressure of each of the tire/wheel assembly bodies is set to 240 kPa, and the assembly body is pressed against a driving drum 40 while applying a load W=13.7 kN to an axle 41. Accordingly, durability is evaluated depending on whether or not a wheel breakage occurs while the driving drum 40 is rotated a million times.

◯: breakage not present x: breakage present

TABLE 2

| | Wheel | Tire | Riding comfortableness | Road noise (dB) | Durability |
|---|---|---|---|---|---|
| Conventional example | a | B | Reference (3) | Reference | ◯ |
| Comparative example 1 | b | B | ◯(3.1) | +0.5 | ◯ |
| Comparative example 2 | c | B | ◯(3.3) | +0.9 | ◯ |
| Comparative example 3 | d | B | ⊚(3.5) | +1.5 | ◯ |
| Comparative example 4 | e | B | ⊚(3.5) | +1.6 | ◯ |
| Comparative example 5 | f | B | ⊚(3.6) | +1.6 | ◯ |
| Comparative example 6 | g | B | ⊚(3.7) | +1.9 | ◯ |
| Example 1 | b | A | ◯(3.1) | −0.3 | ◯ |
| Example 2 | c | A | ◯(3.3) | −0.3 | ◯ |
| Example 3 | d | A | ⊚(3.5) | −0.2 | ◯ |
| Example 4 | e | A | ⊚(3.5) | −0.2 | ◯ |
| Comparative example 7 | f | A | ⊚(3.6) | −0.1 | ◯ |
| Comparative example 8 | g | A | ⊚(3.7) | −0.1 | X |

EXAMPLES 5 TO 7

A tire/wheel assembly body (Example 5) having the same configuration as that of Example 3 other than the following point is manufactured. Specifically, in the tire/wheel assembly body of Example 3, the pneumatic tire is replaced with a pneumatic tire C in which the positions of the reinforcement layers formed of the nylon fiber cords are moved to between the inner side belt layer and the carcass layer as shown in FIG. 1.

Moreover, similarly, a tire/wheel assembly body (Example 6) having the same configuration as that of Example 3 other than the following point is manufactured. Specifically, in the tire/wheel assembly body of Example 3, the pneumatic tire is replaced with a pneumatic tire D in which the nylon fiber cords of the reinforcement layers are changed to aramid fiber cords, and the coat rubber is replaced with rubber having tan δ of 0.15. Furthermore, a tire/wheel assembly body (Example 7) having the same configuration as that of Example 3 other than the following point is manufactured. Specifically, in the tire/wheel assembly body of Example 3, the pneumatic tire is replaced with a pneumatic tire E in which the nylon fiber cords of the reinforcement layers are changed to aramid fiber cords, and the coat rubber is replaced with rubber having tan δ of 0.25.

As to the 3 kinds of tire/wheel assembly bodies described above, riding comfortableness, road noise, and durability are measured by use of the same measuring methods as those described above. The results are shown in Table 3.

TABLE 3

|  | Wheel | Tire | Riding comfortableness | Road noise (dB) | Durability |
|---|---|---|---|---|---|
| Example 5 | d | C | ⊚(3.5) | −0.5 | ○ |
| Example 6 | d | D | ⊚(3.5) | −0.8 | ○ |
| Example 7 | d | E | ⊚(3.5) | −1.1 | ○ |

What is claimed is:

1. A tire/wheel assembly body formed by installing a pneumatic tire on a light-metal wheel with a rigidity index ($\alpha$) of 35 to 65 (1/rad), characterized in that reinforcement layers are arranged at end portions of a belt layer in the pneumatic tire, wherein the reinforcement layers are formed of aramid fiber cords and coat rubber having tan $\delta$ of 0.15 to 0.25, measured at a temperature of 60° C., an initial strain of 10%, an amplitude of ±2%, and a frequency of 20 Hz.

2. The tire/wheel assembly body according to claim 1, wherein the reinforcement layers are inserted between the belt layer and a carcass layer.

3. The tire/wheel assembly body according to claim 1, wherein the reinforcement layers are formed by winding aramid fiber cords in a spiral fashion at an angle of larger than 0° to 15° relative to a circumferential direction of the tire.

4. The tire/wheel assembly body according to claim 1, wherein, by setting the end portions of the belt layer having the maximum width as starting points, the reinforcement layers are arranged so as to be extended to the inside of the belt layer by 5 mm and to the outside of the belt layer by 10 mm from the starting points.

5. The tire/wheel assembly body according to claim 1, wherein the wheel is made of any of aluminum and an aluminum alloy.

* * * * *